United States Patent [19]

Christopherson et al.

[11] 4,265,789

[45] May 5, 1981

[54] CONDUCTIVE POLYMER PROCESSABLE AS A THERMOPLASTIC

[75] Inventors: Phillips Christopherson, Sterling; Rene Aelion, Concord, both of Mass.

[73] Assignee: Polymer Cencentrates, Inc., Clinton, Mass.

[21] Appl. No.: 86,741

[22] Filed: Oct. 22, 1979

[51] Int. Cl.³ .............................................. H01B 1/06
[52] U.S. Cl. .................................. 252/511; 428/244; 428/367; 428/408
[58] Field of Search ............... 252/511, 512, 513, 514; 428/244, 367, 408

[56] References Cited

U.S. PATENT DOCUMENTS

| | | | |
|---|---|---|---|
| 3,963,647 | 6/1976 | Straub | 252/511 |
| 3,976,600 | 8/1976 | Meyer | 252/511 |
| 4,066,576 | 1/1978 | Bork et al. | 252/511 |
| 4,124,747 | 11/1978 | Murer et al. | 252/511 |
| 4,150,193 | 4/1979 | Burns | 252/511 |
| 4,151,126 | 4/1979 | Adelman et al. | 252/511 |

*Primary Examiner*—James J. Bell
*Attorney, Agent, or Firm*—Jerry Cohen

[57] ABSTRACT

A flexible conductive composition of carbon black or other fine conductive particles dispersed in a high molecular weight polymer matrix composed of two phases—a soft elastomeric, low glass transition temperature phase and a hard, crystalline and high glass transition temperature phase.

17 Claims, No Drawings

CONDUCTIVE POLYMER PROCESSABLE AS A THERMOPLASTIC

BACKGROUND OF THE INVENTION

The present invention relates to polymer systems containing highly concentrated dispersions of conductive particles to render them highly conductive yet retaining the properties of flexibility, elongation at break, impact resistance and the thermoplastic melting behavior of the uncompounded polymer system, and processable by conventional resin manufacturing methods in such end product uses as electrodes, electrostatic shields, conductive structural plastics, radiation detectors, electrical circuit components, conductive shoe soles, conveyor belts, fuel tanks, conductive blankets and other uses. This combination of properties is difficult to achieve because of the conflicting effects occurring when any of conductivity, mechanical properties or processability is improved. An improvement in one property is often obtained at the expense of the others. The state of the art, as reflected in the U.S. patents (cited below) and references cited therein shows substantial failure, prior to the present invention, to achieve an effective composition as described above and the provision of which is a principal object of the present invention. Blending of conductive carbon black to impart conductive properties to polymer systems is discussed in Advances in Chemistry, Series 134, published by American Chemical Society, Washington, D.C. Carbon black particles have been blended with such homopolymers as polyethylene, polyvinyl chloride. While the uncompounded polymer has a volume resistivity above $10^9$ ohm cm., the addition of carbon black brings the conductivity down when the loading reaches 10% and the conductivity will increase with increased loadings. With the type of crystalline homopolymer mentioned above, a concentration of 35% of carbon black brings a lowering of such mechanical properties as elongation at break from 400% to 30% the disappearance of a yield point and a lack of flexibility measured by a large increase in flexural modulus and hardness.

More recently, crystalline copolymers have been used as a carrier for carbon blacks as mentioned in U.S. Pat. Nos. 4,124,747 and 4,125,680 to increase conductivity while maintaining processability. In the process of these patents, a composite comprising a crystalline copolymer of propylene ethylene containing 20 to 35 moles of ethylene and carbon black is made and the resultant product is shown as better than similarly compounded polypropylene or polyethylene homopolymers. Mechanical properties of the copolymer blend remained poor however. We have found that a polymer composition comprising essentially at least 3 phases: E—C+A where Phase E is an amorphous elastomeric matrix characterized by a low glass transition temperature and a rubbery behavior defined by ASTM as the capability of being stretched repeatedly twice its original length and upon release of the stress return to it's approximate original length.

Phase C is a crystalline homo or copolymer characterized by a high glass transition temperature usually above room temperature, a relatively high tensile strength and essentially a thermoplastic melt behavior. At high enough temperature this Phase C readily melts and flows into injection molds or through extrusion dies. Phase A is a carbon black additive selected for good conductive properties and characterized by a nitrogen surface area Brunauer Emmett Teller (BET) method, of at least 250 square meters per gram.

A dibutyl Phtalate absorption of 170 cc per 100 grams or better.

A small amount of volatiles, carbon oxygen complexes, less than 2%.

Phase E and C can be either a continuous matrix chemically bound as in a block copolymer or can be partially bound chemically and partially blended or totally blended mechanically. Depending on the end use considered and the properties required, the following polymer system matrix are exemplary of preferred practice of the present invention:

1. Polyolefin Elastomers

Ethylene propylene diene copolymers such as ethylene propylene 1-4 hexane diene, ethylene propylene and ethylidene Norbornene, polyisoprene-polystyrene, polybutadiene-polystyrene are satisfactory in applications where polyolefin-like physical and chemical properties are tolerable or nearly so. The crystalline phase in these copolymers, mainly ethylene propylene copolymer, or polystyrene, can be increased to insure good processability by directly blending an adequate amount of polypropylene or high density polyethylene homopolymer. Examples of these types of matrix are commercial resins such as TPR polyolefins elastomers copolymers, Nordel (TM), EPDM, Royalene (TM), IM 7100 elastomers, and Kraton (TM) 3226.

These polymer systems are characterized by high flexibiltiy, low specific gravity (less than 1.0), moderate cost and high chemical resistance which make them very attractive in such end uses as injection molded battery components. Ease of processing as a thermoplastic can be enhanced either by increasing the crystalline part of the copolymer or by direct blending with such homopolymer as polypropylene, high density polyethylene.

2. Polyester, Polyurethane Elastomers

In the polyester category, the amorphous phase is a polyglycol such as polytetramethylene ether glycol block copolymerized with a polyester such as polybutylene terephthalate. Polyurethane can also be used where the hard segment is a polyisocynate such as 2, 4 or 2,6 toluene diisocyanate and butane diol while the elastomeric phase is a polyether or polyester block such as tetramethylene oxide or butylene adipate.

These polymer systems are characterized by relatively high specific gravity above 1.2, medium cost, high tensile strength, limited chemical resistance. This combination of properties make them very suitable for extrusion applications such as conductive thin film. Examples of these types of systems are commercial resins such as Roylar (TM) and Dyvax (TM). High percentages of the amorphous phase are necessary to maintain good properties and easy blending of the carbon black particles. Processability is greatly enhanced without harming the mechanical properties by blending small percentages of polyethylene glycol homopolymer.

3. Fluoro Elastomers

The elastomeric parts of these elastomers can be unsatuated fluoride polymers such as vinylidene fluoride or alkyl vinyl ether such as methyl perfluoro vinyl ether and the crystalline part is a polyfluoro polymer such as polytetrafluoroethylene, polyhexa fluoro propylene. Examples of these types of resins are Viton (TM), Teflon (TM), PFA all supplied by E. I. DuPont and equivalents of which are supplied by others. These polymer systems are selected for end uses requiring excellent heat and chemical resistance regardless of the cost (which is very high).

The above list of polymers is by way of examples and the present invention is not restricted to the chemical families defined above.

PROCESSING

It is important to disperse the conductive particles A in the polymer composition E & C as well as possible because the conductivity of the final blend increases with the quality of the dispersion. There is an advantage in blending first the carbon black particles with a polymer system containing a high percentage of elastomeric amorphous phase to insure as good a dispersion as possible and then adding the crystalline phase until the required melt flow and ease of processability is obtained. The quality of the initial dispersion can be further enhanced as follows. A certain percentage of the selected resin, 10 to 90% by mole concentration and preferably 30 to 70%, is first pulverized in order to decrease its particle size by a factor of at least halving the ASTM mesh size of same, preferably substantially. The pulverized material is then dry blended with the total amount of particles A in a conventional high speed mixer for 1 to 4 minutes until it forms a uniform blend. To this mixture is then added the non-pulverized portion of the selected polymer composition and the aggregate fed into a conventional continuous mixing device such as a Banbury or a discontinuous mixing device such as a roll mill. If it is necessary at that stage to increase the melt flow of the aggregate material, a similar polymer system with a higher percentage of the crystalline phase C or the crystalline polymer itself can be added. We have found that the use of a roll mill presents the additional advantage of giving an excellent mixing with a minimum requirement of energy compared to continuous mixing systems because of the much smaller amount of materials being mixed at any given time. In particular, less than 10% by volume, preferably less than 1%, materials to be mixed are undergoing mixing force application at any given time. These conditions allow low force application which is necessary to achieve desired composites using the ingredients described herein. This process has been carried out in most of the examples of this application set out below.

The following non-limiting examples illustrate an embodiment of preferred practice of the invention:

EXAMPLE 1

Seventy-five parts of a two phase polymeric matrix composed of an ethylene propylene 1-4 hexane diene copolymer blended with a high density polyethylene is first subjected to the action of a roll mill heated by steam to 250° F. Twenty-five parts of a carbon black of BET nitrogen surface area of 1,000 square meter per gram and dibutyl phthalate absorption of 340 mil per 100 gram are added rapidly. After 10 minutes of roll milling, the mixture is uniform and can be stripped off the mill. The material is highly flexible and the volume resistivity as measured by ASTM Test Method D257-61 is 0.5 ohm per cm. The material is then ground and re-extruded in a conventional extruder into strands, quenched and pelletized. The conductive polymer is then ready for injection molding or extrusion into thin sheets or films.

In this example, commercial products were used, Nordel NDR 4167 EPDM supplied by E. I. DuPont and Ketjenblack E.C. carbon, supplied by Akzona Inc.

EXAMPLE 2

The same processing method, as in Example 1 was used with a copolymer of ethylene propylene and ethylidene norbornene (bi cyclo 221 heptane). Fifty parts of such a matrix was roll milled first and 50 parts of a carbon black with a nitrogen surface area of 254 square meter per gram and a dibutyl phtalate absorption of 178 cc per 100 grams was rapidly added to the roll mill until a uniform mix is obtained. The crystalline phase was then increased by the direct addition on the roll of a polypropylene homopolymer of 30 melt index. The material was then stripped of the roll mill and the volume resistivity was 1 ohm/cm. The final composition was 45% amorphous elastomer phase; 5% crytalline phase; 50% carbon black.

Commercial products were used in this example TPR 1600 copolymer supplied by Uniroyal and Vulcan XC-72 carbon supplied by Cabot Corporation.

EXAMPLE 3

Processing conditions similar to Example 2 were employed except that TPR 5260 was blended with Vulcan XC-72 and polypropylene of 30 melt index. The final composition was:
Amorphous phase: 50% (by weight)
Crystalline phase: 6%
Carbon Black: 44%
Resistivity was equal to 1.5 ohm/cm.

EXAMPLE 4

An ethylene propylene copolymer with a ratio of 75 parts of ethylene and 25 parts of propylene was roll milled to an homogenous mix and Ketjenblack EC carbon black was added thereto. The crystalline phase therein was then increased by addition of a high density polyethylene homopolymer of 1.2 melt index and 0.95 density. The final composition was:
Amorphous phase: 50%
Crystalline phase: 20%
Carbon black: 30%
Resistivity was 1.0 ohm/cm.
In this case Royalene (TM) IM 7100 from Uniroyal was used.

EXAMPLE 5

In a similar fashion (to Example 4), a Vulcan XC-72 carbon black was used in the following composition:
Royalene IM 7100: 40%
Vulcan XC-72: 44%
Polypropylene 30 melt index: 16%
to give a mixture with a resistivity of 1 ohm/cm.

EXAMPLE 6

A block copolymer of terephtalic acid, 1-4 butane diol and polytetramethylene ether glycol was roll milled. Carbon black was added in a similar fashion (as in Example 4) into the roll mill until the upper limit of incorporation was reached. At that point the amorphous phase of the block copolymer was increased by the introduction of a similar copolymer but with a much higher percentage of polyether amorphous phase. The binding efficiency was immediately increased to the point where 50% carbon black could be added easily. The final composition was:

Amorphous phase: 30%
Crystalline phase: 20%
Carbon black: 50%

The resistivity of the blend was 1 ohm cm.

In this case Dyvax 5050 and Dyvax 722 plastics supplied by DuPont were used with Vulcan XC-72 carbon.

EXAMPLE 7

The same procedure (as in Example 4) was used with only Dyvax 722 and Ketjenblack E.C. An homogenous blend of 65% Dyvax 722 and 35% Ketjenblack E.C. gave a resistivity of 1 ohm per cm.

EXAMPLE 8

The Example 4 procedure was used, but the processability of materials was increased by addition of a polyethylene glycol homopolymer of 20,000 molecular weight to the mixture of Dyvax 722 and Ketjenblack E.C.

EXAMPLE 9

The procedures of Example 4 were repeated using this time polyurethane type elastomers. Commercial resins produced by Uniroyal under the trade marks of Roylar were blended with carbon black, in the following compositions:

Blend 1
Roylar 84N: 70 parts
Carbowax 14000: 5 parts
Ketjenblack E.C.: 25 parts

The resistivity of the blend was 1.5 ohm/cm.

EXAMPLE 10

A fluoroelastomer of vinylidene fluoride and hexafluoropropylene was first roll milled at room temperature. Water cooling was used to maintain the rolls at low temperature. Vulcan XC-72 was gradually added until a 50/50 blend was achieved. The mixture has a resistivity of 0.7 ohm/cm. The resin used was a Viton A-HV type fluoroelastomer produced by E. I. DuPont.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. A flexible conductive plastic composite processable as a thermoplastic resin by injection molding or extrusion and having a volume resistivity of less than 10 ohm per cm, a Brabender torque of less than 1500 meter per grams at a temperature of 20° C. above melt, a minimum elongation at break of 50% and a brittleness temperature at failure of less than −10° C., the composition comprising a matrix of two phases, one an elastomeric amorphous polymer of glass transition temperature of less than 10° C., the other phase a crystalline polymer or copolymer with a glass transition temperature above 25° C., the two phases being bound together, the crystalline phase comprising less than 60% of the total of the two phases by mole concentration, and a dispersion in said two phase matrix of conductive particles characterized by a volume resistivity of 0.01 to 1 ohm/cm and a dibutylphthalate/oil absorption of at least 150 cc per 100 grams and comprising as a percentage by weight of the composite of 15% to 75%.

2. Composite of claim 1 wherein the conductive particle is a carbon black with a nitrogen surface area, BET method, of at least 250 square meter per gram, and less than 2% volatiles.

3. Composite of claim 1 wherein the matrix comprises a polyolefin diene elastomer phase and a polyolefin crystalline phase.

4. Composite of claim 3 wherein the diene is 1-4 hexane diene.

5. Composite of claim 3 where the diene is ethylidene norbornene.

6. Composite of claim 3 wherein the polyolefin is a copolymer of ethylene and propylene.

7. Composite of claim 3 wherein the ethylene propylene 1-4 hexane diene is blended with high density polyethylene.

8. Composite of claim 3 where ethylene propylene 1-4 hexane diene is blended with polypropylene.

9. Composite of claim 1 wherein the matrix comprises a polybutadiene elastomer phase and a polystyrene crystalline phase.

10. Composite of claim 1 wherein the matrix comprises a polyether elastomer and a polyurethane crystalline phase.

11. Composite of claim 10 wherein the polyurethane is a 2,4 toluene diisocyanate copolymerized with butylene adipate.

12. Composite of claim 10 wherein the polyurethane is based on 2,6 toluene diisocyanate.

13. Composite of claim 1 wherein the matrix comprises a polyether elastomer phase and a polyester crystalline phase.

14. Composite of claim 13 wherein the polyester is a terephthalic acid butane diol and the polyether is polytetramethylene ether glycol.

15. Composite of claim 1 wherein the polymer matrix is a fluoroelastomer.

16. Process for making the polymeric composite of claim 1, wherein an amount 10 to 90% of mole concentration of the total amount of an elastomer-crystalline polymer material required for a given composite is first pulverized to decrease its particle size and such portion is blended with substantially the totality of the conductive particles required for a given composite in a low force mixer, then adding to this initial blend, in a second step, the remaining non-pulverized polymeric composition, and then finally blending the composite as a whole under low force conditions.

17. Process in accordance with claim 16 wherein 30 to 70% of initial polymer is pulverized in said first step.

* * * * *